United States Patent Office

2,851,433
Patented Sept. 9, 1958

2,851,433

TREATMENT OF RESIDUAL LIQUOR

Raymond G. Booty, Granville, Ohio, assignor, by mesne assignments, to American-Marietta Company, Chicago, Ill., a corporation of Illinois No Drawing. Application March 10, 1955
Serial No. 493,574

20 Claims. (Cl. 260—29.3)

The present invention relates to the treatment of residual process liquor for the recovery of useful ingredients thereof. In particular, it relates to the treatment of an aqueous salt solution containing residual organic material deriving from an alkaline condensation reaction between phenol and formaldehyde.

It is known to condense phenol and formaldehyde in an aqueous mass in the presence of an alkaline catalyst to form a so-called water-soluble phenol-formaldehyde resin. Conventionally, the formed solution of said resin is dewatered by vacuum evaporation. However, it is possible to dewater such a condensation mass by the addition of saline material to salt out the resin as a liquid layer in a phase-forming action. As a result, saline material is concentrated in the lower aqueous phase and the resin substance is concentrated in the upper liquid phase, with distribution of small amounts of saline material and water in the resin phase and small amounts of organic substance in the aqueous phase. Upon separation of the two phases, the resin phase may be processed to use or to recover its major constituent of resin as well as its minor constituents of saline material.

When the saline material of the two-phase mass is a sodium salt of orthophosphoric acid, and predominantly disodium orthophosphate, the aqueous phase may contain from 25% to 50% or more of such saline substance, commonly about 30%, and up to approximately 6% of dissolved organic constituents, including resin in an amount of about 2% of the whole. The constitution of such a liquor presents problems in treating it to recover salt content economically as a useful salt material free from organic contaminants, and to recover the resin content.

It is an object of the present invention to provide a method for treating such a salt solution to recover ingredients thereof for economic utility.

It is a particular object of the invention to provide a method for recovering a useful salt product substantially free from organic contaminants.

It is also an object of the invention to separate the organic and inorganic solutes of such liquor and to provide one or more useful materials.

Various other and ancillary objects and advantages of the invention will become apparent from the following description and explanation of the invention.

In order to illustrate one manner in which the salt solution for the present invention may be produced, one example is given, but it is to be understood that the invention is not limited to any particular process for yielding the mixed solution to be treated by the present invention.

U. S. P. phenol in the amount of 3140 pounds is mixed with 5500 pounds of aqueous formaldehyde solution containing 50% by weight of formaldehyde HCHO, less than 2% of methyl alcohol and the remainder water. To the mixture at 75° C. is slowly added 450 pounds of a 50% by weight solution of caustic soda NaOH in water, at a regular rate within 60 minutes, while maintaining the mass at 75° C. After an addtitional 40 minutes the mass is cooled to 60° C.

Then 250 pounds of anhydrous disodium phosphate $Na_2HPO_4$ is added and, when it is dissolved, the cooling is continued to 30° C. Then 350 pounds of a 75% solution in water of phosphoric acid $H_3PO_4$ is added, which brings the pH to 7.6 and raises the temperature to one in the range from 34° to 40° C. On standing, two liquid layers form with aqueous phosphate solution in the lower layer and a dewatered resin solution above. The lower layer is withdrawn as a typical liquor for practice of the present invention. Modifications of the procedure are disclosed in my copending application Serial No. 367,496, filed July 13, 1953, now abandoned, and in my copending application Serial No. 500,057, filed April 8, 1955, as a continuation-in-part of said Serial No. 367,496.

A typical analysis of the lower aqueous phase resulting from the process above described is as follows:

Mixed Salts:                                    Percent
  $Na_2HPO_4$ ------------------------------------ 22.5
  $NaH_2PO_4$ ------------------------------------ 7.5
Formaldehyde ------------------------------------ 2.0
Phenol ------------------------------------------- .5
Phenol-Alcohols --------------------------------- 1.0
Resin -------------------------------------------- 2.0

Depending upon numerous factors, such as the perfection in phase separation, and the extent of the resin-forming reaction, the resin content may be present in part as a suspension and in part as a solute. By centrifugal separation the suspended resin may be recovered, yielding a salt solution for practice of the present invention.

Such a solution has presented problems in economy to secure the salt content in reusable form, and to secure dissolved resin for use, preferably as an addition to material made by a process which also produces the salt solution to be treated. I have discovered that the dissolved resin content in the solution may be advanced to the extent that there is formed in said solution a distinct liquid, gel or solid phase containing the resin which phase may be separated from the salt-containing phase to recover the resin. If the resin content is appreciable, it is preferred to separate it as a liquid for useful recovery of it. However, small or even useful amounts may be retained as a liquid until such time as it gels or solidifies in the heating step. By heating the salt solution at a temperature in the range from 70° C. to its boiling temperature of about 105° C., at atmospheric pressure, the resin-phase formation takes place. This occurs in the first few minutes at the boiling point, but at 90° C. about one hour is needed and a still longer time as the temperature is lower. Temperatures above 105° C. and pressures above atmospheric may be used to further accelerate the reactions but this is not preferred for obvious reasons.

When the heating is continued after the liquid-resin phase is formed and separated, for a total time of several days at 70° C. or about 12 hours at 90° C. to the atmospheric boiling temperature, a granular phenolic precipitate is formed which includes all the phenol of the original liquor and the phenol-alcohols, all as phenol-alcohols, leaving in solution only the salt and residual formaldehyde. If the resin content has been retained, it may be contaminated with this precipitate on separation.

The pH of the liquid for the above-described heating operation may be from 5 to 9, but it preferably is maintained at pH of 7. The extent to which the phenol-formaldehyde condensation mass is neutralized at the time of salting out for phase formation predetermines the pH of the aqueous phase. However, such pH may be lowered, preferably by the use of phosphoric acid or monosodium acid phosphate, or the pH may be raised, preferably by addition of disodium acid phosphate or trisodium phosphate. By use of these agents all having the phosphate radical and only sodium as a base, there is no resulting contamination of the desired end-product salt.

When the pH at the time of heating for the desired separation is over 9, the formaldehyde content is converted by a prolonged reaction to a relatively non-volatile substance, and, therefore, not subject to removal by the process. Such solid material forms a contaminant of the end-product salt. If the pH of the mass being heated is under 5, the precipitate of phenol-alcohols is not formed. When a higher pH range in the dried salt is desired, it is necessary to add the caustic soda after separating the resin and polyphenols, but just before drying to avoid converting the formaldehyde to a non-volatile form.

Thus, in processing the liquor, the resin-containing phase is formed, and removed as a liquid or retained, and then the precipitated phase is formed. When the liquid resin phase is retained, it later gels and then solidifies. As a gel or solid it may remain in the vessel and parted from the aqueous phase at any time, as in isolating the latter after the precipitation is completed. A clear salt solution may be recovered by filtration or decantation. The resulting salt solution may be treated to evaporate the water and form a solid salt, with loss of formaldehyde in the process. This is preferably done by passing the solution over a drum drier at a temperature of 250° to 375° F. thus to drive off the dissolving water and crystallize the salt content. During this procedure, the residual formaldehyde is volatilized and lost. A resulting salt cake is formed consisting substantially entirely of sodium salts of orthophosphoric acid and about 6% of moisture. This salt may be used in salting out another batch of the phenol-formaldehyde condensation product in the manner described above, or in one of the modifications of such procedure as set forth in my said copending application.

An alternative step is to add sufficient sodium hydroxide to the salt solution just before evaporating it to convert all of the salt content to trisodium phosphate as a useful by-product. The addition of caustic soda for this purpose raises the pH to about 12. Since heating at this pH over a long period of time leads to conversion of the formaldehyde to relatively non-volatile substance, the conversion may be avoided by evaporating the water substantially immediately after adding the caustic soda. Thus, the caustic soda may be added just before flash-drying the solution on the heated drum. By this procedure the addition of caustic soda and the drying may be accomplished within about 20 minutes. By this prompt drying after raising the pH above 9, the formaldehyde is volatilized before such conversion may occur.

Where the presence of formaldehyde is not detrimental to use of the salt solution, with or without the added caustic soda to form $Na_3PO_4$, the evaporating to solid salt may be dispensed with, and such is contemplated as falling within the scope of the invention as expressed in the appended claims.

I claim:

1. The method of treating a solution in water containing sodium salts of orthophosphoric acid and small dissolved quantities of phenol, formaldehyde, phenol-formaldehyde, phenol-alcohols and a resin-forming condensation product of phenol and formaldehyde, which comprises heating the solution having a pH from 5 to 9 at a temperature upwardly from 70° C. whereby to effect formation of two liquid phases, separating and removing from the lower aqueous phase the upper liquid phase resultingly containing phenol-formaldehyde resin, continuing the heating of the remaining aqueous phase and thereby forming a precipitate containing material originating from phenolic constituents of the original solution, and separating the precipitate from the remaining aqueous salt solution containing dissolved formaldehyde.

2. The process of claim 1 followed by evaporating water from the solution and forming a solid salt residue whereby the formaldehyde content escapes with the water vapor.

3. The process of claim 1 followed by adding caustic soda to the salt solution in quantity to form trisodium phosphate.

4. The process of claim 3 followed by evaporating water from the solution and providing a solid salt residue.

5. The process of claim 4 wherein the evaporation is carried out by flash-drying water from the solution substantially immediately after addition of the caustic soda whereby formaldehyde escapes with water vapor.

6. The method of treating a solution in water containing sodium salts of orthophosphoric acid and small dissolved quantities of phenol, formaldehyde, phenol-alcohols and a resin-forming condensation product of phenol and formaldehyde, which comprises heating at atmospheric pressure said solution having a pH from 5 to 9 at a temperature upwardly from 70° C. to its boiling point, whereby to effect formation of two liquid phases, separating and removing from the lower aqueous phase the upper liquid phase resultingly containing phenol-formaldehyde resin, continuing the heating of the remaining aqueous phase and thereby forming a precipitate containing material originating from phenolic constituents of the original solution, and separating the precipitate from the remaining aqueous salt solution containing dissolved formaldehyde.

7. The process of claim 6 followed by evaporating the solution and forming a solid salt residue whereby the formaldehyde content escapes with the water vapor.

8. The process of claim 6 followed by adding caustic soda to the salt solution in quantity to form trisodium phosphate.

9. The process of claim 8 followed by evaporating water from the solution and providing a solid salt residue.

10. The process of claim 9 wherein the evaporation is carried out by flash-drying water from the solution substantially immediately after addition of the caustic soda whereby formaldehyde escapes with water vapor.

11. The method of treating a solution in water containing sodium salts of orthophosphoric acid and small dissolved quantities of phenol, formaldehyde, phenol-alcohols and a resin-forming condensation product of phenol and formaldehyde, which comprises heating the solution having a pH from 5 to 9 at a temperature upwardly from 70° C. whereby to effect formation of an aqueous phase and a resin-containing phase, continuing the heating of the aqueous phase and thereby forming a precipitate containing material originating from phenolic constituents of the original solution, and isolating the resulting aqueous phase as a salt solution containing dissolved formaldehyde.

12. The process of claim 11 followed by evaporating water from the solution and forming a solid salt residue whereby the formaldehyde content escapes with the water vapor.

13. The process of claim 11 followed by adding caustic soda to the salt solution in quantity to form trisodium phosphate.

14. The process of claim 13 followed by evaporating water from the solution and providing a solid salt residue.

15. The process of claim 14 wherein the evaporation is carried out by flash-drying water from the solution substantially immediately after addition of the caustic soda whereby formaldehyde escapes with water vapor.

16. The method of treating a solution in water containing sodium salts of orthophosphoric acid and small dissolved quantities of phenol, formaldehyde, phenol-alcohols and a resin-forming condensation product of phenol and formaldehyde, which comprises heating at atmospheric pressure said solution having a pH from 5 to 9 at a temperature upwardly from 70° C. to its boiling point, whereby to effect formation of an aqueous phase and a resin-containing phase, continuing the heating of the aqueous phase and thereby forming a precipitate containing material originating from phenolic constituents of the original solution, and isolating the resulting aqueous phase as a salt solution containing dissolved formaldehyde.

17. The process of claim 16 followed by evaporating the solution and forming a solid salt residue whereby the formaldehyde content escapes with the water vapor.

18. The process of claim 16 followed by adding caustic soda to the salt solution in quantity to form trisodium phosphate.

19. The process of claim 18 followed by evaporating water from the solution and providing a solid salt residue.

20. The process of claim 19 wherein the evaporation is carried out by flash-drying water from the solution substantially immediately after addition of the caustic soda whereby formaldehyde escapes with water vapor.

References Cited in the file of this patent

UNITED STATES PATENTS

| | | |
|---|---|---|
| 2,489,569 | Foulds et al. | Nov. 29, 1949 |
| 2,676,143 | Lee et al. | Apr. 20, 1954 |